US007124412B2

(12) United States Patent
Fish et al.

(10) Patent No.: US 7,124,412 B2
(45) Date of Patent: Oct. 17, 2006

(54) EXTENSIBLE BIOS ERROR LOG

(75) Inventors: Andrew J. Fish, Olympia, WA (US); Robert P. Hale, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 544 days.

(21) Appl. No.: 09/737,140

(22) Filed: Dec. 13, 2000

(65) Prior Publication Data

US 2002/0073353 A1 Jun. 13, 2002

(51) Int. Cl.
*G06F 15/163* (2006.01)
*G06F 9/00* (2006.01)

(52) U.S. Cl. .......................................... 719/310; 713/2

(58) Field of Classification Search ................ 709/328; 719/328, 310; 710/1; 713/1, 2
See application file for complete search history.

(56) References Cited

U.S. PATENT DOCUMENTS 5,732,282 A * 3/1998 Provino et al. ............. 709/324
5,951,685 A * 9/1999 Stancil .......................... 713/2
6,064,368 A * 5/2000 Kang ......................... 345/158

OTHER PUBLICATIONS

Persistor CF1 User's Manual BIOS Management Calls, Jul. 1998, Persistor Instruments Inc.*
Using The NT Registry for Driver Install, 1997, OSR System Resources, Inc.*

* cited by examiner

*Primary Examiner*—William Thomson
*Assistant Examiner*—LeChi Truong
(74) *Attorney, Agent, or Firm*—Blakely, Sokoloff, Taylor & Zafman LLP

(57) ABSTRACT

An apparatus that includes a BIOS routine, and a method executed during a BIOS routine, that includes a stored BIOS program causing a computer to receive information, including error information, from at least one first units coupled to the computer, store the information in a memory; and for each of at least one second units coupled to the computer, receive an initial request for the information from the second unit and in response to the request, provide to the second unit at least one of the information stored before the receipt of the request if any is stored, and provide to the second unit at least one of the information to the second unit received subsequent to the request.

24 Claims, 2 Drawing Sheets

EXTENSIBLE BIOS ERROR LOG

BACKGROUND OF THE INVENTION

1. Field of the Invention

The present invention relates to the field of computer system BIOS initialization, and more particularly to a method and apparatus of logging device errors during BIOS initialization and making a record of those errors available to devices during the BIOS initialization.

2. Background Information

The BIOS is a collection of executable programs that initializes a computer system. At least a portion of the BIOS resides in a non-volatile random access storage device in the computer system, and upon turning on the computer system, or alternatively resetting the computer system, the BIOS executes from the nonvolatile storage device. An executing BIOS initializes the computer system. The initialization task generally includes checking for the presence or absence of devices within the computer system, initializing those devices that require software initialization, testing the computer system hardware, reporting the system configuration and diagnostic status, and loading an operating system.

The devices comprising the computer system are alternatively resident on the computer system chipset, or coupled to the chipset via a system of buses that may include a host bus, legacy buses, and Peripheral Component Interconnect (PCI) buses. The host bus supports the highest performance resources on a platform and generally includes the CPU, a cache, and platform memory that may include dynamic random access memory. The term "platform" represents the physical collection of hardware on a single circuit board. The legacy buses may include the Industry Standard Architecture (ISA), EISA, and MC buses. Each of the host bus, legacy buses, and the PCI bus are well known to those skilled in the art.

The devices themselves are alternatively separate physical devices, or software routines. A separate physical device often has a driver software routine resident on system memory that forms the interface between the BIOS and the device. The BIOS itself can be considered to include at least one of these device routines if that routine executes a BIOS function, and particularly if that routine resides on the same non-volatile storage device as the BIOS.

During a computer system BIOS routine initialization, each device sequentially initializes under the control of the executing BIOS routine. However, an at least one device that has already initialized may acquire component and system information during its execution that is useful to and should be provided to at least one other device. Examples of such information is a device that has tried to read from a memory (e.g. a disk) and encountered an error, and a device that is coupled to a channel that is presumed to be losing data. This information includes error information, status information, configuration information, and event information pertaining to devices and systems. The acquired information should be able to be made available to other devices. These other devices can include information logging devices and devices whose execution and/or state may be dependent upon the information.

However, when some of these other devices have not yet initialized, they cannot yet be sent this information by the acquiring devices. These other devices should receive all the acquired information already generated after each initializes, and should receive all the information acquired after each initializes as the information is acquired. Moreover, each of the information acquiring devices and information requesting device should communicate with the BIOS and receive and transmit this information in a standard way, so that each receiving and transmitting device can receive or transmit information without being aware of the other devices in the computer system, or require an ad hoc interface and processing routine for each separate device or computer system.

SUMMARY OF THE INVENTION

According to one aspect of the invention, a method includes a processor executing a BIOS routine receiving information from at least one first computing system units; the processor storing the received information in a memory; and for each second computing system units, the processor receiving an initial request for the received information from the second computing system unit, in response to the request the processor providing to the second computing system units at least one of the received information stored in the memory before a receipt of the request, and the processor providing to the second computing system unit at least one of the received information received subsequent to the request.

BRIEF DESCRIPTION OF DRAWINGS

The present invention will be described by way of exemplary embodiments, but not limitations, illustrated in the accompanying drawings. Identical numerals indicate the same elements throughout the figures.

DETAILED DESCRIPTION OF THE INVENTION

In the following description, various aspects and details of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to those skilled in the art that the present invention may be practiced without the specific aspects and details. In other instances, well known features are omitted or simplified, including apparatus and method steps, in order not to obscure the present invention.

An embodiment of the present invention includes a program stored on a machine readable storage medium. In that regard, the machine readable medium includes any mechanism that provides (i.e. stores and/or transmits) information in a form readable by a machine such as a computer. For example, a machine readable medium includes, and is not limited to, read only memory (ROM); random access memory (RAM); magnetic disk storage media; optical storage media; flash memory devices; electrical, optical, acoustical or other form of propagated signals (such as carrier waves, infrared signals, digital signals, and so forth), or any type of media suitable for storing electronic instructions.

Various operations will be described as multiple discrete steps performed in turn in a manner that is most helpful in understanding the present invention. However, the order of description should not be construed as to imply that these operations are necessarily order dependent, in particular, the order the steps are presented. Any necessary ordering is alternatively expressly mentioned or will be understood by those skilled in the art. Furthermore, the phrases "in one embodiment" and/or "an embodiment" are used repeatedly. However the phrases do not necessarily refer to the same embodiment, although they may.

Figure 1:
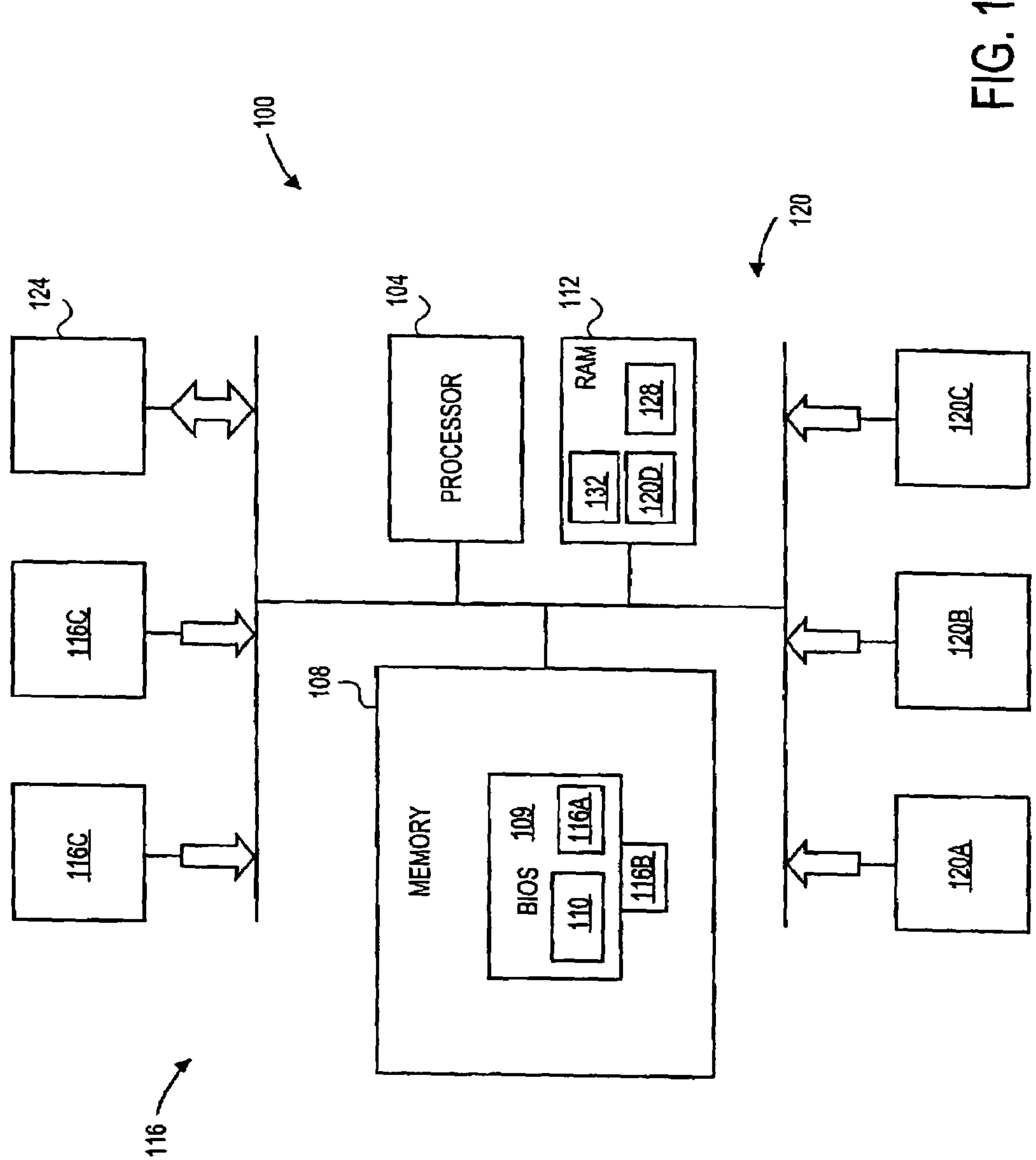
FIG. 1 portrays a logical block diagram of an embodiment of the computing system of the present invention, including exemplary error logging information input and output devices.

Referring to FIG. 1, a computing system 100 includes at least one processor 104 that is coupled by a CPU bus 111 to a solid-state non-volatile random access memory 108 that includes the processor power-on/reset address. The memory 108 stores a BIOS routine 109 at the power-on/reset address location that includes an error logging hub 110 of the present invention. The processor 104 also is coupled by the CPU bus 111 to a random access memory 112 that can be written to and read from. This random-access memory can be a cache, a DRAM, a synchronous direct random access memory (SDRAM), a double data rate (DDR) SDRAM, a quad data rate (QDR) SDRAM, a $D^3DR$ SDRAM, or other memory device that is preferably directly coupled to the CPU bus. The random access memory 112 stores an error logging hub information record database 128 and a second device registration database 132, each presently described with reference to FIG. 2. If the non-volatile random access memory 108 device includes a capability to be read into, memory device 112 may be omitted from the description of the present invention and the functions attributed to it may instead be executed by the memory device 108. In the preferred embodiment of this invention, the non-volatile random access memory device 108 is a read-only device (ROM). The processor 104, CPU bus 111, and memory systems 108 and 112 are together generally mounted on a common motherboard (not shown).

Coupled to the processor 104 are first devices (or units) 116 and second devices (or units) 120. The first devices 116 are devices that have acquired information during the BIOS execution that should be transmitted to other devices. The second devices 120 are the other devices that should receive this information. It is specifically within the contemplation of this invention that the first devices 116 and the second devices 120 are not mutually exclusive, and that at least one first device (or unit) 116 may also be a second device (or unit) 120. It is specifically contemplated that the first and second devices 116 and 120 are alternatively separate physical devices coupled to the processor by a bus, or are software routines resident on system memory including a software interface commonly know as a driver for a physically separate device, and a configuration extension. As a software routine, the first and second devices 116 and 120 may be resident on the non-volatile random access memory 108 or on a non-volatile mass storage device such as a disk 124 that is loaded into random access memory 112 by the processor in response to the BIOS 109 execution.

The first devices 116 are software routines that execute during at least a portion of the BIOS 109 execution, or alternatively circuits that are clocked during at least a portion of the BIOS 109 execution. The first devices 116 have acquired component and system information and report this information to the BIOS error logging software hub 110 according to the present invention. The reported information includes at least one of error information, status information, configuration information, and event information. Exemplary first devices 116 include software routines that are resident in the non-volatile memory (108) 116*a* and that are themselves BIOS routines that report information, software routines that are plug-ins in the non-volatile memory (108) 116*b* that function as modular BIOS 109 extensions and may be thought of as a platform specific component of the BIOS 109, physically separate or memory resident independent hardware vendor units 116*c*, such as video cards or SCSI devices on the motherboard or their system resident drivers or extensions that are derived from a source independent of the BIOS provider, and separate computer system physical devices 116*d* that may or may not have software modules stored on the non-volatile memory 108 such as an interrupt controller, timer, an Integrated Drive Electronics (IDE) disc controller built into the chipset, and bus components such as bridges and devices attached to the buses.

The second devices 120 acquire the information transmitted by the first devices from the BIOS error logging software hub 110 according to the present invention. These second devices 120 take the information and alternatively process it, store it, or send it to a third device, and can include exemplary SMBIOS log 120*a*, IPMI log 120*b*, and OEM log 120*c* devices, as well as computing system 100 resident software routines 120*d* executing from the random access memory 120 that are alternatively downloaded from the non-volatile read random access memory 108 or the non-volatile storage device 124.

Figure 2:
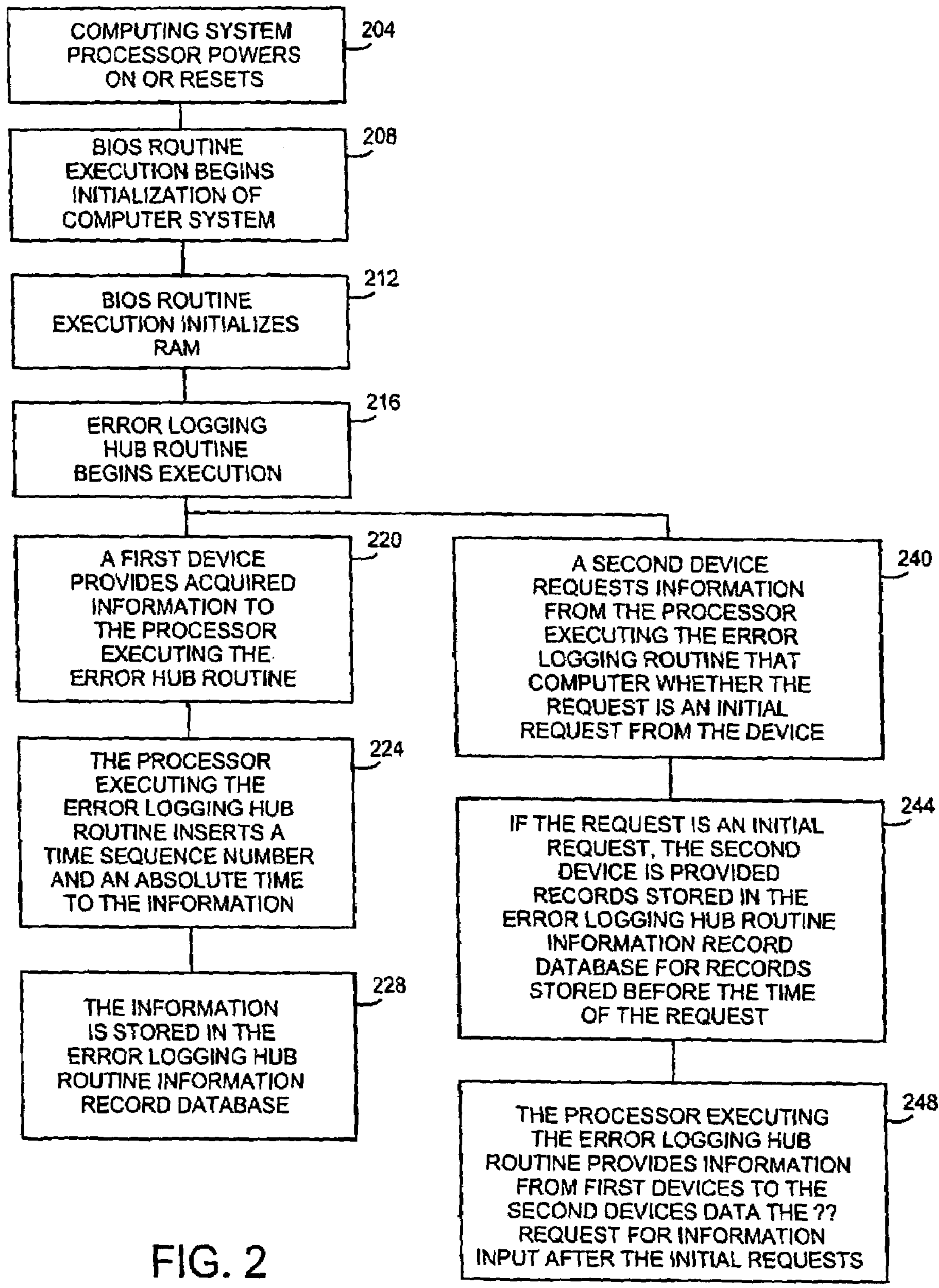
FIG. 2 portrays a flow chart of an embodiment of the operation of the error logging hub routine of the present invention and its host computing system. The order of description does not mean that the operations portrayed are order of description dependant. Any necessary ordering is alternatively expressly mentioned or will be understood by those skilled in the art.

Referring to FIG. 2, after the computing system (100) powers on or resets 204, the BIOS routine (109) begins computing system device initialization 208. The BIOS routine (109) is stored in a non-volatile ready-on-start-up random access memory. During the computing system device initialization procedure, the processor (104) in response to the BIOS routine (109) initializes the random access memory (112) 212, preferably early in the initialization procedure so that the random access memory (112) is available to be used for writing to and reading from during the BIOS initialization, and specifically by the executing BIOS software. The BIOS error logging hub routine (110) of the present invention preferably is called (begins its execution) 216 early in the BIOS initialization before first devices (116) are initialized, preferably soon after the random access memory (112) is initialized, so that the executing error logging hub routine (110) can receive and process according to the present invention as much information as possible that is acquired by these first devices (116). The error logging hub routine (110) begins its execution by a general initialization that includes an initialization of error logging hub data structures and/or representations.

After the error logging hub routine (110) start-up 216, the processor (104) in response to the error logging hub routine (110) preferably operates as a background task during the remainder of the BIOS initialization procedure by alternatively responding to interrupt calls or scheduled executive calls. It is specifically within the contemplation of the present invention that the error logging hub routine (110) of the present invention continues to operate after the operating system is executing. The error logging hub routine executes after start-up by receiving information from the first devices (116) in the form of information reports, processing that information, and providing the information in the form of information reports to the second devices (120) as shall be presently described.

A device providing information to the processor (104) is defined as a first device (116) herein. The first devices (116) provide information that they acquire to the processor (104)

that is running under the control of the error logging hub routine (110) 220. The information provided is input in the form of a standard formatted that includes a predetermined meaning and syntax. The preferred record format includes a standard header and a first device (116) defined payload region. The payload region includes a coded representation of the provided information, each code having a meaning according to the generating first device (116). Each first device (116) provides this coded information, because the first device (116) has found the information and has knowledge of its own specific device characteristics. The providing first device (116) places a unique identifier of itself, preferably its global unique identifier (GUID) in alternatively the header or the payload, to uniquely identify the generating first device 116). The processor (104) under the control of the error logging hub routine (110) places in each header a time sequence number and an absolute time when the information has been input into the database 224. Alternatively, an embodiment includes the absolute time placed into the record header by the reporting first device (116). The processor (104) under the control of the BIOS error logging hub routine (110) stores the record in the error logging hub information record database (128). Preferably, the information is provided according to an Application Program interface (API) procedure published by the processor (104) under the control of the error logging hub routine (110), wherein the error logging hub routine provides a memory pointer to the reporting first device (116) as a RAM (112) address for placement of a specific information record into the error logging hub information record database (128). While it is understood that this invention includes arranging the records in the error logging hub information record database (128) according to any information in a record's header and payload, including specifically first device, each provided first device (116) record is preferably arranged in the error logging hub information record database (128) according to its time sequence number, wherein no two records will have the same time sequence number, because absolute time may not have adequate granularity 228.

A device requesting information from the processor (104) is defined as a second device (120) herein. A second device (120) preferably requests first device (116) information according to a published API procedure. When any specific device initially requests first device (116) information from the processor (104) running under the control of the BIOS error logging routine (110), the processor (104) checks a unique identifier of the requesting device, preferably its GUID, in the second device registration database (132) 240.

If the device identifier is not in the second device registration database (132), the processor (104) registers the requesting device by entering its identification into the second device registration database (132) as a second device (120) 244 and sends to the second device (120) stored first device (116) information records from the error logging hub information record database (128). While it is understood that this invention includes sending to the previously unregistered second device a categorized subset of the records stored in the error logging hub information record database (128) determined from information in each record's header or payload, the preferred embodiment of this invention includes the processor (104) under the control of the BIOS error logging hub routine (110) sending to the previously unregistered second device (120) all first device (116) received information records in the error logging hub information record database (128) by time sequence number. The time sequence of information reports has utility in understanding the state of the computing system and its individual units, and the causative relationship between information reports because one error or state may cause another error or state.

The processor (104) under the control of the BIOS error logging hub routine (110) preferably sends each received information record to each registered second device (120) after the sequence number and absolute time (of block 224) have been included in a record. It is understood that this invention includes sending to each second device a categorized subset of the records stored in the error logging hub information record database (128) determined from information in each record's header or payload 248. Thus, each time there is an entry into the error logging hub information record database (128), the processor (104) preferably logs to every one of the registered second devices (120), preferably by logging to each registered second device API. Alternatively, if the device identifier is in the second device registration database (132), the processor (104) sends to that second device all records for that second device that have accumulated since the last provision of records to that second device.

While certain exemplary embodiments have been described and shown in the accompanying drawings, it is to be understood that these embodiments are merely illustrative of and not restrictive of the broad invention. The present invention is not limited to the specific constructions and arrangements shown and described, and alternative embodiments will become apparent to those skilled in the art to which the present invention pertains without departing from the scope of the present invention. The scope of the present invention is defined by the appended claims rather than the foregoing description.

We claim:

1. A method comprising:

a processor executing a BIOS routine by receiving information from at least a first computing system unit, the information comprising at least one of error information, status information, and configuration information;

the processor executing the BIOS routine by storing the received information in a memory;

for a second computing system unit, the processor executing the BIOS routine by receiving an initial request from the second computing system unit for the received information;

the processor executing the BIOS routine by providing to the second computing system unit in response to the received request at least one of the received information stored in the memory before the receipt of the initial request if any is stored; and the processor executing the BIOS routine by providing to the second computing system unit at least one of the received information received subsequent to the initial request;

wherein the provided received information stored before the receipt of the request includes one of all the received information and a categorized subset of all the received information.

2. The method defined in claim 1 wherein the information comprises at least one of unit information, system information, error information, status information, configuration information, and event information.

3. The method defined in claim 1 wherein the receiving the information from the first unit is according to an API.

4. The method defined in claim 1 wherein the providing the information to the second unit is according to an API.

5. The method defined in claim 1 wherein the storing the received information in a memory is according to a time of receipt of the information.

6. The method defined in claim 1 wherein the providing at least one of the received information stored in the memory before a receipt of the request is according to a time of receipt by the processor.

7. The method defined in claim 1 wherein the information received by the processor is appended to include at least one of a sequence number and an absolute time.

8. The method defined in claim 1 wherein the provided information received subsequent to the request includes one of all the received information and a categorized subset of all the received information.

9. A machine-readable medium that provides instructions, which when executed by a processor, cause said processor to perform operations comprising:

during execution of a BIOS routine, receiving information from at least one first computing system unit, the information comprising at least one of error information, status information, and configuration information;

during execution of the BIOS routine, storing the received information in a memory;

for a second computing system unit, during execution of the BIOS routine, receiving an initial request for the received information from the second computing system unit;

during execution of the BIOS routine in response to the initial request, providing to the second computing system unit at least one of the information stored in the memory before the receipt of the initial request if any is stored; and during execution of the BIOS routine, providing to the second computing system unit at least one of the received information received subsequent to the initial request;

wherein the provided received information stored before the receipt of the request includes one of all the received information and a categorized subset of all the received information.

10. The medium defined in claim 9 wherein the information comprises at least one of unit information, system information, error information, status information, configuration information, and event information.

11. The medium defined in claim 9 wherein the receiving information is according to an API.

12. The medium defined in claim 9 wherein the providing the information stored to the second units is according to an API.

13. The medium defined in claim 9 wherein the storing the received information in a memory is according to a time of receipt of the information.

14. The medium defined in claim 9 wherein the providing the received information stored in the memory before a receipt of the request is according to a time of receipt by the processor.

15. The medium defined in claim 9 wherein the information received is appended to include at least one of a sequence number and an absolute time.

16. The medium defined in claim 9 wherein the provided information received subsequent to the request includes one of all the received information and a categorized subset of all the received information.

17. A computer that comprises:

a stored BIOS program in a non-volatile memory that includes instructions that cause the computer to:

receive information from a first unit coupled to the computer, the information comprising at least one of error information, status information, and configuration information;

store the received information in a memory;

for a second unit coupled to the computer, receive an initial request for the information from the second unit;

in response to the initial request, provide to the second unit at least one of the information stored in the memory before the receipt of the initial request if any is stored, and provide to the second unit at least one of the received information to the second unit received subsequent to initial the request;

wherein the provided received information stored before the receipt of the request includes one of all the received information and a categorized subset of all the received information.

18. The computer defined in claim 17 where the information includes at least one of unit information, system information, error information, status information, configuration information, and event information.

19. The computer defined in claim 17 wherein the receive information from the first units is according to an API.

20. The computer defined in claim 17 wherein the provide to the second unit information is according to an API.

21. The computer defined in claim 17 wherein the store the received information in a memory is according to a time or receipt of the information.

22. The computer defined in claim 17 wherein the provide the received information stored in the memory before a receipt of the request is according to a time of receipt of the information.

23. The computer defined in claim 17 wherein the information received by the processor is appended to include at least one of a sequence number and an absolute time.

24. The computer defined in claim 17 wherein the provided information received subsequent to the request includes one of all the received information and a categorized subset of all the received information.

* * * * *